(12) United States Patent
Grobelny

(10) Patent No.: US 12,309,138 B2
(45) Date of Patent: May 20, 2025

(54) MANAGING CREDENTIALS USABLE IN THE ORCHESTRATION OF WORKSPACES BY MULTIPLE REMOTE ORCHESTRATORS

(71) Applicant: Dell Products, L.P., Round Rock, TX (US)

(72) Inventor: Nicholas D. Grobelny, Evergreen, CO (US)

(73) Assignee: Dell Products, L.P., Round Rock, TX (US)

(*) Notice: Subject to any disclaimer, the term of this patent is extended or adjusted under 35 U.S.C. 154(b) by 164 days.

(21) Appl. No.: 18/155,839

(22) Filed: Jan. 18, 2023

(65) Prior Publication Data

US 2024/0244045 A1 Jul. 18, 2024

(51) Int. Cl.
| | |
|---|---|
| H04L 29/06 | (2006.01) |
| G06F 8/77 | (2018.01) |
| G06F 21/62 | (2013.01) |
| H04L 9/40 | (2022.01) |

(52) U.S. Cl.
CPC ............ *H04L 63/0823* (2013.01); *G06F 8/77* (2013.01); *G06F 21/6218* (2013.01); *H04L 63/0876* (2013.01); *H04L 63/20* (2013.01)

(58) Field of Classification Search
CPC . H04L 63/0823; H04L 63/0876; H04L 63/20; H04L 63/10; H04L 63/102; H04L 63/105; G06F 8/77; G06F 21/6218; G06F 21/62; G06F 21/6209; G06F 21/629
See application file for complete search history.

(56) References Cited

U.S. PATENT DOCUMENTS

| | | | | |
|---|---|---|---|---|
| 9,807,073 | B1 * | 10/2017 | Miller | G06F 21/6218 |
| 2018/0248885 | A1 * | 8/2018 | Lemay | G06F 21/6209 |
| 2019/0332421 | A1 * | 10/2019 | Kozlowski | G06F 9/4856 |
| 2021/0096553 | A1 * | 4/2021 | Stump | G05B 19/41835 |
| 2021/0133329 | A1 * | 5/2021 | Andrews | G06F 21/577 |

* cited by examiner

*Primary Examiner* — Malcolm Cribbs
(74) *Attorney, Agent, or Firm* — Fogarty LLP

(57) ABSTRACT

Systems and methods for managing credentials usable in the orchestration of workspaces by multiple remote orchestrators are described. In an illustrative, non-limiting embodiment, an Information Handling System (IHS), may include a processor and a memory coupled to the processor, the memory having program instructions stored thereon that, upon execution by the processor, cause the IHS to: allow a first remote orchestrator to manage a workspace instantiated by the IHS in response to the first remote orchestrator having a first credential, where the first remote orchestrator is associated with a first domain; receive a request from a second remote orchestrator to manage the workspace, where the second remote orchestrator is associated with a second domain within the first domain; and allow the second remote orchestrator to manage the workspace in response to a determination that the second remote orchestrator has a second credential provided by the first remote orchestrator.

16 Claims, 8 Drawing Sheets

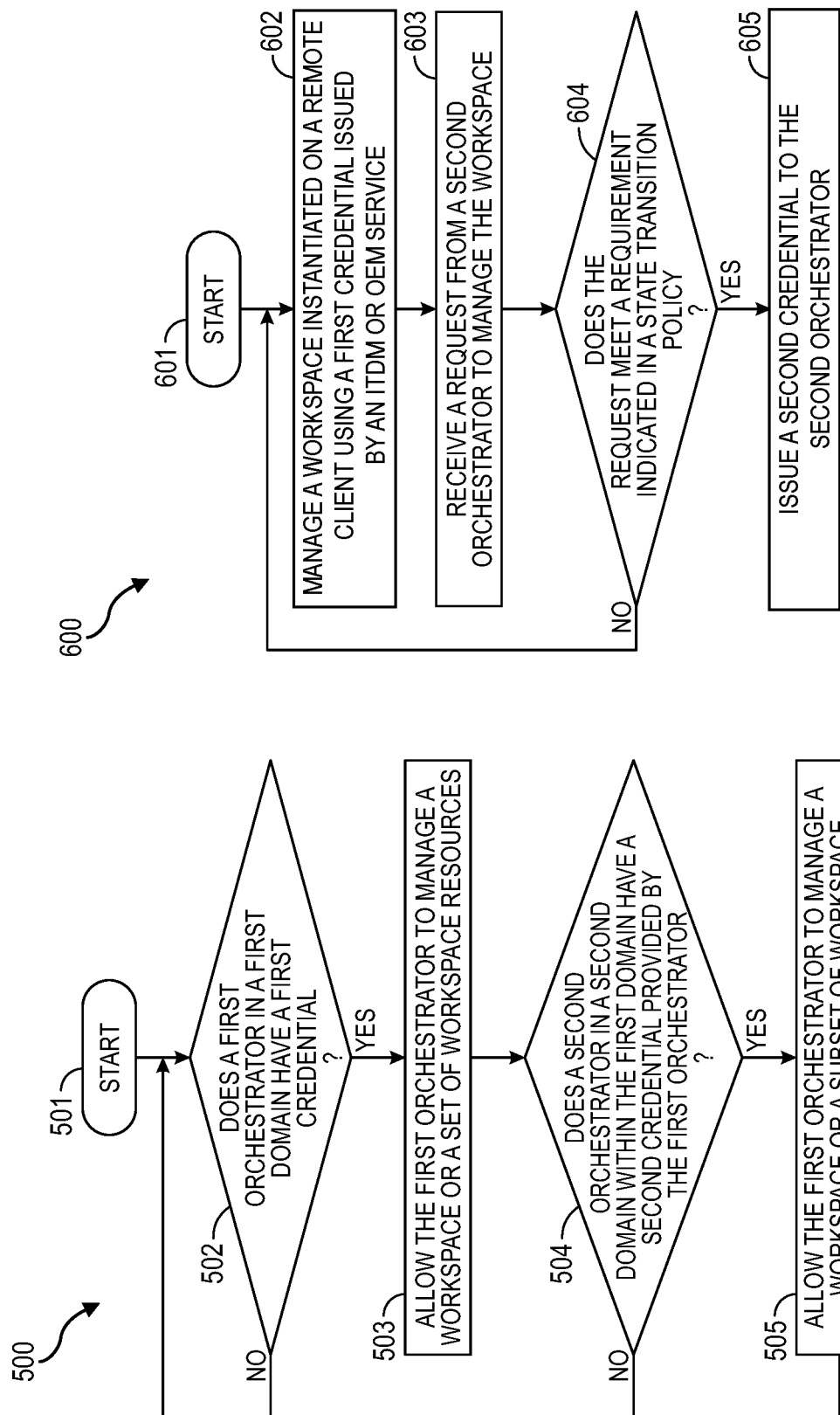

MANAGING CREDENTIALS USABLE IN THE ORCHESTRATION OF WORKSPACES BY MULTIPLE REMOTE ORCHESTRATORS

FIELD

This disclosure relates generally to Information Handling Systems (IHSs), and, more specifically, to systems and methods for managing credentials usable in the orchestration of workspaces by multiple remote orchestrators.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Once an IHS has been delivered and deployed, malicious actors may seek to gain access to the IHS. Upon gaining such access to the IHS, a malicious actor may attempt to download protected data from the IHS, such as downloading trade secrets, personal information and financial information from the IHS. A malicious actor may also attempt to upload data to a compromised IHS, such as uploading malicious instructions that provide the malicious actor with at least some control of the IHS. Malicious actors may attempt to gain access to an IHS via a wide variety of entry points. The set of possible entry points for gaining access to an IHS or disabling an IHS may be referred to as the attack surface of the IHS.

Organizations may own and/or manage large numbers of IHSs. For instance, an employer may provide laptop computers to employees and may also operate various other types of IHSs, such as rack-mounted servers and networking equipment, to support operation of the laptops. In another example, educational institutions may support various types of IHSs, such as tablets, that are issued to students and employees. Medical institutions may also support a variety of IHSs that may be used by patients, visitors and/or staff. In all such instances, the users and IHSs that are being supported is continually evolving.

Many IHSs, such as laptops and tablets, are portable and are commonly used in different locations, even if only within the same building or residence. Some IHSs are also used in public locations and may be regularly used in a variety of different public and private locations. Based on such changes in location, an IHS may be coupled to different external devices, such as a laptop being docked at different workstations. In some instances, the external devices that may be occasionally connected to an IHS may include both public and private devices, such as use of an IHS while coupled to a home office workstation and use of the IHS at airport, hotel, and corporate shared-use workstations.

SUMMARY

Systems and methods for managing credentials usable in the orchestration of workspaces by multiple remote orchestrators are described. In an illustrative, non-limiting embodiment, an Information Handling System (IHS), may include a processor and a memory coupled to the processor, the memory having program instructions stored thereon that, upon execution by the processor, cause the IHS to: allow a first remote orchestrator to manage a workspace instantiated by the IHS in response to the first remote orchestrator having a first credential, where the first remote orchestrator is associated with a first domain; receive a request from a second remote orchestrator to manage the workspace, where the second remote orchestrator is associated with a second domain within the first domain; and allow the second remote orchestrator to manage the workspace, at least in part, in response to a determination that the second remote orchestrator has a second credential provided by the first remote orchestrator.

In some implementations, first and second remote orchestrators may each be operated by an entity selected from the group consisting of: an Information Technology Decision Maker (ITDM), an Original Equipment Manufacturer (OEM), a workspace management software developer, and a third-party. The first domain may provide or restrict access to or from a first set of one or more workspace resources, and the second domain may provide or restrict access to or from a second set of one or more workspace resources.

The first and second sets of one or more workspace resources may include at least one of: an application, a service, a policy, an Operating System (OS), a database, a cloud Application Programming Interface (API), cloud storage, or a hardware device. In some cases, the first set of one or more workspace resources may include the second set of one or more workspace resources. Meanwhile, the first and second credentials may include at least one of: a password, an encryption key, or a digital certificate.

The first domain may include an ITDM or OEM domain, and the second domain may include a workspace management software developer domain or a third-party domain. Prior to the second remote orchestration being allowed to manage the workspace, the program instructions, upon execution, may cause the IHS to revoke or invalidate the first credential.

To allow the second remote orchestrator to manage the workspace, the program instructions, upon execution, may cause the IHS to enforce a state transition policy. The state transition policy may be configured to allow a selected state transition. Additionally, or alternatively, the state transition policy may be configured to deny a selected state transition. In some cases, the state transition policy may be included or indicated in a workspace definition used to instantiate the workspace. To allow the second remote orchestrator to manage the workspace, the program instructions, upon execution, may cause the IHS to enforce a state transition policy configured to deny a selected state transition.

The program instructions, upon execution by the processor, may cause the IHS to: receive a file configured to enable instantiation of the workspace based upon a workspace definition; and instantiate the workspace based upon the file. The first remote orchestrator may be configured to: calculate a security target and a productivity target based upon context information; and create the workspace definition based upon the security target and the productivity target.

For example, the context information may include at least one of: an identification of a location of the IHS, an identification of a user of the IHS, an identification of a network of the IHS, an identification of hardware of the IHS, an identification of a requested datafile, or an identification of a storage system of the requested datafile.

In another illustrative, non-limiting embodiment, a hardware memory having program instructions stored thereon that, upon execution by a first orchestrator, enables the first orchestrator to: receive a request from a second orchestrator to manage a workspace, where the first orchestrator is configured to manage the workspace using a first certificate issued by a workspace management software developer or OEM service, where the first orchestrator belongs to a first management domain, and where the second orchestrator belongs to a second management domain; and issue a second certificate to the second orchestrator in response to the request meeting a requirement indicated in a state transition policy, where the second certificate allows the second orchestrator to manage the workspace with a same or a fewer set of privileges as the first orchestrator.

The program instructions, upon execution by the first orchestrator, may enable the first orchestrator to issue a third certificate that allows a user to manage the workspace with a same or a fewer set of privileges as the first orchestrator.

In yet another illustrative, non-limiting embodiment, a method may include: receiving a request from a user, at an orchestrator among a plurality of orchestrators, to manage a workspace instantiated by a client, where each of the orchestrators is assigned to a respective domain, and where the orchestrator is configured to manage the workspace using a certificate; and at least in part in response to the request meeting a requirement indicated in a state transition policy applicable to a domain of the first orchestrator, issuing another certificate to the user, wherein the other certificate enables the user to manage the workspace.

For example, the state transition policy may be included or indicated in a workspace definition used by the client to instantiate the workspace.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 5-7 are diagrams illustrating examples of methods for managing credentials usable in the remote orchestration of workspaces, according to various embodiments.

DETAILED DESCRIPTION

Figure 1:
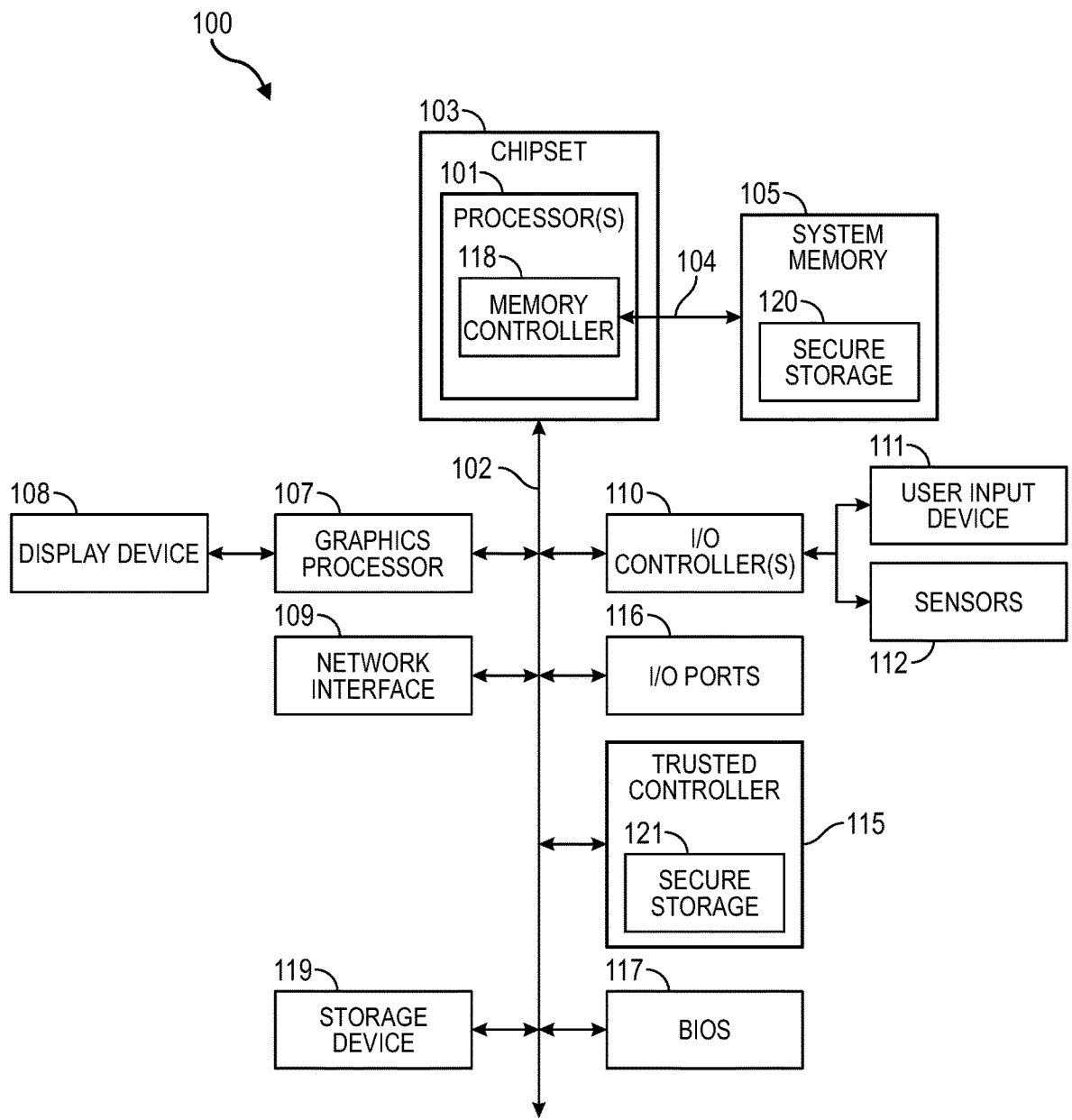
FIG. 1 is a diagram depicting illustrative components of an Information Handling System (IHS) configured to support workspaces operating on the IHS, according to various embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers.

FIG. 1 is a diagram depicting illustrative components of an Information Handling System (IHS) 100 configured, according to various embodiments, to support workspaces operating on the IHS. In some embodiments, IHS 100 may be employed to instantiate, manage, and/or terminate a workspace, such as a secure environment that may provide the user of IHS 100 with access to enterprise data while isolating the enterprise data from an Operating System (OS) and/or other applications executed by IHS 100. A workspace may operate using a variety of different configurations of the hardware and software resources of the IHS 100, where the resources that are used may be selected based on the security and risk context of a request to access protected data. As described in additional detail below, a primary workspace and one or more subordinate workspaces may operate on an IHS 100, such that a variety workspace topologies may be supported using the available computing resources of the IHS 100, including computing resources of external devices coupled to the IHS. Based on the current risk and security context in which an IHS 100 is operating, embodiments may switch between use of different workspace topologies that are supported by an IHS.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a segregated and protected portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. As described in additional detail below, in certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS. In some embodiments, an OOB connection supported by network interface 109 may support a variety of remote management operations by trusted controller 115, including providing remote management of IHS 100 and/or of hardware components installed in IHS 100. As described in additional detail below, embodiments of IHS 100 may utilize OOB connections to interface with multiple remote orchestration services that may each provide different types of support for workspaces operating on IHS 100.

Chipset 102 of IHS 100 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102. In some embodiments, a display device 108 coupled to IHS may include discrete logic and memory resources that may be used in the operation of a workspace. As described in additional detail below, in embodiments, a subordinate workspace may operate using the resources of display device 108 and may operate based on a workspace definition provided by a primary workspace operating on core resources of IHS 100, such as CPU 101 and system memory 105. In some scenarios, an external display device 108 coupled to IHS 100 may be a public or shared-use display monitor, such as provided to the user of IHS 100 via a shared or public workstation.

In certain embodiments, chipset 103 may utilize one or more I/O controllers 110 to access hardware components such as user input devices 111 and sensors 112. For instance, I/O controller 110 may provide access to user-input devices 111 such as a keyboard, mouse, touchpad, touchscreen and/or other peripheral input devices. User input devices 111 may interface with I/O controller 110 through wired or wireless connections. In some embodiments, any or all of the user-input devices 111 coupled to IHS may be discrete devices with their own logic and memory resources that may be used in the operation of a workspace. As described in additional detail below, a subordinate workspace may operate using the resources of such user-input devices 111 and may operate based on a workspace definition provided by a primary workspace operating on core resources of IHS 100. In some scenarios, user-input devices 111 coupled to IHS 100 may be a public or shared-use devices, such as a keyboard and mouse of a shared or public workstation.

Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.). In some embodiments, any or all of the sensors 112 coupled to IHS may be discrete devices with their own logic and memory resources that may be used in the operation of a workspace. A subordinate workspace may operate using the resources of such sensors 112 and may operate based on a workspace definition provided by a primary workspace operating on core resources of IHS 100.

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and can determine the orientation and movement of IHS 100 (e.g., IHS 100 is motionless on a relatively flat surface, IHS 100 is being moved irregularly and is likely in transport, the hinge of IHS 100 is oriented in a vertical direction thus indicating the IHS 100 is being used in a book mode). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, inattentive and/or facing integrated display 108.

In cases where the end-user is present before IHS 100, the sensor hub may further determine a distance between the end-user and the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security context of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. Starting from a closed position, a first range of hinge angles may indicate a laptop posture, a second range of hinge angles may indicate a landscape posture, and a third range of hinge angles may indicate a tablet posture of the IHS 100. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side with the hinge in a vertical orientation, the IHS may be determined to be in a book mode. In another example where the IHS 100 is determined to be tilted such that the hinge is oriented between horizontal and vertical, the user's face is detected to be facing the integrated display, and IHS 100 is experiencing irregular, slight movements, the sensor hub may determine that IHS 100 is being used in a book posture while the user is in transit. In another example, the sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration in response to detecting a hinge angle within a defined range, such as between 300 and 345 degrees, and detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100. In some embodiments, peripherals coupled to IHS 100 via I/O ports 116 may be discrete devices with their own logic and memory resources that may be used in the operation of a workspace. As described in additional detail below, a subordinate workspace may operate using the resources of such external peripherals and may operate based on a workspace definition provided by a primary workspace operating on core resources of IHS 100. In some scenarios, external peripherals coupled to IHS 100 may be a public or shared-use devices, such as a projector utilized within a conference room.

Chipset 103 also provides processor(s) 101 with access to one or more storage devices 119. In various embodiments, storage device(s) 119 may be integral to IHS 100, or may be external to IHS 100. In certain embodiments, storage device(s) 119 may be accessed via a storage controller that may be an integrated component of the storage device. Storage device(s) 119 may be implemented using any memory technology allowing IHS 100 to store and retrieve data. For instance, storage device(s) 119 may be a magnetic hard disk storage drive or a solid-state storage drive. In some embodiments, storage device(s) 119 may be a system of storage devices, such as a cloud drive accessible via network interface 109. In some embodiments, storage devices 119 coupled to IHS 100 may be discrete devices with their own logic and memory resources that may be used in the operation of a workspace. A subordinate workspace may operate using the resources of such storage devices 119 and may operate based on a workspace definition provided by a primary workspace operating on core resources of IHS 100.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, a trusted controller 115 is coupled to IHS 100 and may support various functions for management of IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service. In some embodiments, such out-of-band communications may be utilized by a remote orchestration service in communicating with the trusted controller 115 in selecting the resources of the IHS that are used as the underlying computing architecture that is used to host a workspace on the IHS 100.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via a secure logical environment that operates using computational and memory resources of trusted controller 115, where the environment operates in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the memory resources of trusted controller 115 include a secured storage 121 that may be utilized to store cryptographic information for use in authorization of workspaces.

In certain embodiments, cryptographic capabilities of trusted controller 115 may be used to calculate signatures that uniquely identify individual components of IHS 100. In such scenarios, trusted controller 115 may calculate a hash value based on instructions used to configure a hardware component coupled to IHS 100 and/or based on a set of instructions used to operate a software program. For instance, trusted controller 115 may calculate a hash value based on firmware, settings and/or other instructions that are used in the operation of a hardware component coupled to the IHS 100, such as by a network controller, storage drive, storage controller, FPGA, or hardware accelerator. In some instances, reference signatures for individual components of an IHS 100 may be calculated as part of a trusted manufacturing and factory provisioning process of the IHS and may be stored for use as reference signatures within a secure storage 121 of the trusted controller 115.

Once the IHS 100 has been delivered and deployed, trusted controller 115 may be configured to calculate hash values based on firmware and other instructions that are loaded for use by individual hardware components of the IHS. The hash value recalculated for the component may then be compared against the reference signature in order to determine if any modifications have been made to the instructions to be used to operate the component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature based on instructions being utilized to operate trusted controller 115 and comparing it to a reference signature calculated during a trusted process for manufacture of IHS 100. In various embodiments, one or more of these operations supported by trusted controller 115 may be implemented using BIOS 117.

In some embodiments, firmware instructions utilized by trusted controller 115 may also implement procedures for the management of power that is available for operating IHS 100. For instance, trusted controller 115 may interface with a power adapter in managing the output levels of the power adapter that may be drawn for use by IHS 100. In some embodiments, trusted controller may determine the power status of IHS 100, such as whether IHS 100 is operating strictly from battery power or is plugged into an AC power source and may specify restrictions on power use based on the power status of the IHS. Trusted controller 115 may be used to operate a secure execution environment that may include operations for managing various core functions of IHS 100 based on power availability, such as power management and management of certain operating modes of IHS 100 (e.g., turbo modes, maximum operating clock frequencies of certain components, etc.). Accordingly, IHS 100 may support the use of various power modes. In some embodiments, the power modes of IHS 100 may be implemented through operations of trusted controller 115 and/or the OS of IHS 100. In various embodiments, IHS 100 may support various reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

As described in additional detail below, an IHS 100 may support the operation of one or more workspaces, each operating using resources of IHS 100 that are specified within a respective workspace definition, where an individual workspace provides operation of software programs and access to protected data in varying degrees of isolation from the operating system of the IHS and from other workspaces. Also as described in additional detail below, an individual workspace may be hosted by an IHS 100 using various combinations of the described software and hardware resources of the IHS.

For instance, a workspace may be configured to operate as a type of virtual machine that runs in isolation from the operating system of the IHS 100, but that relies on certain shared software libraries and other resource of the IHS 100. In another instance, a workspace may operate as a different type of virtual machine that not only runs in isolation from the operating system of the IHS 100, but also does not share any libraries and operates using a segregated portion of memory 105 of the IHS. In another instance, a workspace may operate as a container application that runs within the operating system of the IHS 100, but that provides a segregated computing environment in which applications and data that are accessed via the container are not otherwise accessible by other programs or containers hosted by the operating system. In another instance, a workspace may operate within the operating system of an IHS 100 as a web-browser application that runs using libraries and other resources utilized by the web browser. In another instance, a workspace may be configured to operate such that a graphical interface for the workspace is displayed in a display device 108 of the IHS 100, but the workspace operates in full or in part in a cloud resource, thus isolating certain aspects of the workspace entirely from the IHS 100. In each of these scenarios, a workspace may operate using a primary workspace that operates on core resources of an IHS and using one or more subordinate workspaces that operate on external devices that are coupled to an IHS 100.

Each of these exemplary computing architectures that utilize resources of IHS 100, to support workspaces present different attack surfaces that may be exploited by malicious actors. As described in additional detail below, the computing architecture that is selected for use by a workspace may be selected based in part on a security context that may account for the security posture of the IHS 100, the user of the IHS 100, the use of subordinate workspaces, the environment in which IHS 100 is being operated and/or the information that is being accessed via the workspace. As such, the attack surface presented by the computing architecture of a workspace, and any subordinate workspaces, may be selected to be commensurate with the security context in which the workspace will operate.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

Figure 2A:
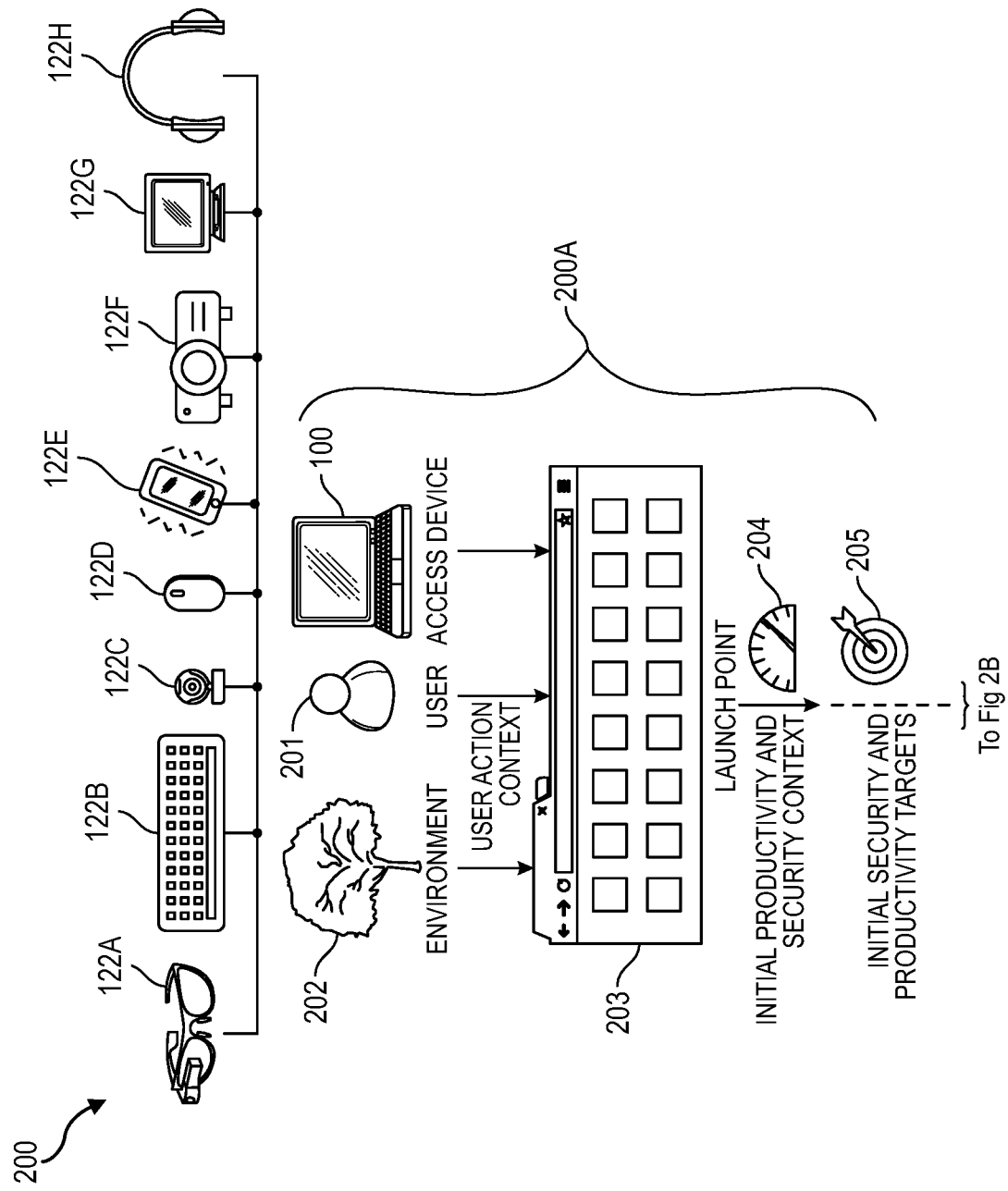
FIGS. 2A and 2B are diagrams depicting a method for orchestrating the deployment and operation of workspaces on an IHS, according to various embodiments.
Figure 2B:
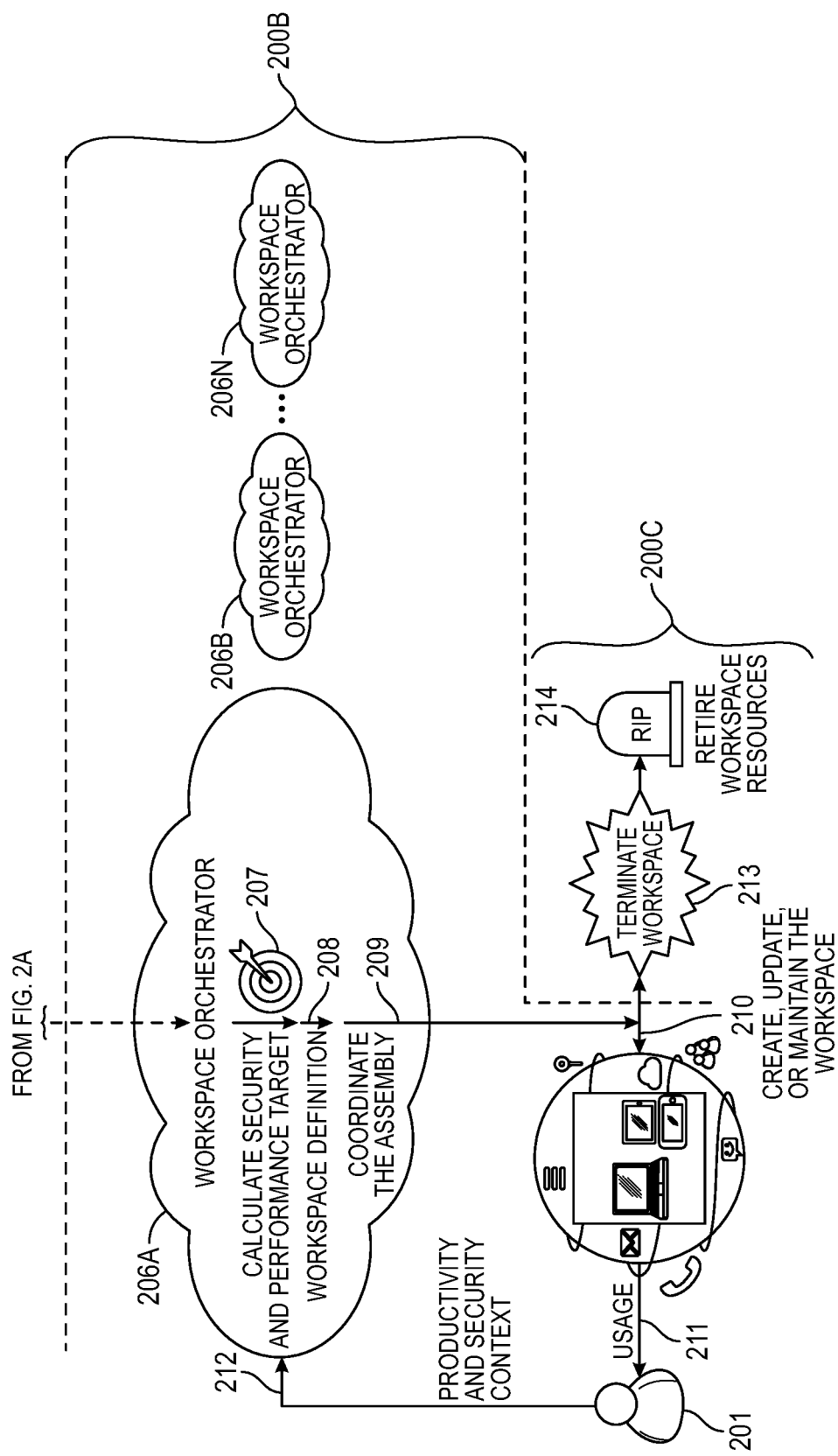

In some embodiments, the construction of a workspace for a particular purpose and for use in a particular context may be orchestrated remotely from IHS 100 by workspace orchestration services 206, such as described with regard to FIGS. 2A and 2B. In some embodiments, portions of the workspace orchestration, including the creation and delegation of tasks to subordinate workspaces, may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

FIGS. 2A and 2B are diagrams depicting a method, according to various embodiments, for orchestrating the deployment and operation of workspaces on an IHS 100. For sake of illustration, the method has been split into three phases: workspace initialization phase 200A, workspace orchestration phase 200B, and workspace termination phase 200C.

During initialization phase 200A, user 201 (e.g., an enterprise user) operates an IHS 100 (e.g., a desktop, a laptop, a tablet, a smart phone, etc.), such as described with regard to FIG. 1, within physical environment 202 (e.g., any type of environment and its associated context, including physical location, geographic location, location within a particular facility or building, detected wireless networks, time of day, proximity of the user to IHS 100, other individuals in the vicinity of IHS 100, etc.).

In some embodiments, initialization phase 200B may begin with user 201 selecting workspace options that are supported by launch point 203 that may be, for example, a corporate launch point provided by an employer of user 201, a launch point provided by the manufacturer of IHS 100, a launch point provided in support of a software application operating on IHS 100, or a launch point provided as a service to user 201 by a third-party. In some implementations, user 201 may operate IHS 100 to access launch point 203 provided, for example, in the form of a web portal, a portal application running in the OS of IHS 100, a special-purpose portal workspace operating on IHS 100, or the like.

In various implementations, launch point 203 may include Graphical User Interface (GUI) elements representing different software applications, data sources and/or other resources that the user may desire to execute and/or manipulate within a workspace. In various embodiments, launch point may provide a graphical, textual and/or audio interface by which data or other resources may be requested for use within a workspace by user 201. In this manner, user 201 may be provided with launch point 203 selections that provide access to one or more software applications and an aggregation of user's data sources that are available across one or more datastores (e.g., local storage, cloud storage, etc.).

As described in additional detail below, workspaces for providing user 201 with access to requested data or other resources may operate using a local management agent 332 that operates on IHS 100 and is configured to interoperate with a workspace orchestration service that may include one or more remote workspace orchestrators 206A-N. In various embodiments, launch point 203 may be provided in the form of a portal (e.g., a webpage, OS application or special purpose workspace) that allows user 201 to request access to managed resources.

In various embodiments, launch point 203 may be hosted by a remote workspace orchestrator 206A-N, local management agent 332 operating on IHS 100, or any suitable combination thereof. Examples of launch point 203 technologies may include WORKSPACE ONE INTELLIGENT HUB from WMWARE, INC., and DELL HYBRID CLIENT from DELL TECHNOLOGIES INC., among others.

In other embodiments, initialization phase 200A may begin when user 201 chooses to launch an application or access a data source managed by a workspace orchestration service that may be implemented using one or more workspace orchestrators 206A-N. In response to an access request issued by user 201 (e.g., the user "clicks" on an icon of launch point 203), local management agent 332 of IHS 100 collects initial security and productivity context information at 204.

For example, security context information may include attributes indicating a security risk associated with: the data and/or application being requested, a level of risk presented by the user 201, the hardware utilized by IHS 100, the logical environment of IHS 100 in which a workspace will be deployed to provide access to the requested data and/or application, characteristics of external devices 100A-H that are coupled to IHS 100, and the physical environment 202 in which IHS 100 is currently located.

Accordingly, in this disclosure, the term "security context" generally refers to data or other information related to a security posture in which a workspace will be deployed and utilized, where the security posture may be based on the user, IHS 100, security characteristics of external devices 100A-H coupled to IHS 100, data to be accessed via the workspace, and/or environment 202. A security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

For example, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the OS and other applications in use on IHS 100, availability of encryption, type of available encryption, access to secured storage, use of attestable hardware by IHS 100, supported degree of workspace isolation by IHS 100, external devices 100A-H that are coupled to IHS 100, etc.

The term "productivity context" generally refers to user productivity associated with a workspace, user, IHS, and/or environment. A "productivity score" generally refers to an index usable to score, quantify, or measure various productivity characteristics of a productivity context. Examples of productivity context information include, but are not limited to: the hardware of the IHS, the software of the IHS (e.g., the OS), power states and maximum clock frequencies of selected components of the IHS, peripheral devices 100A-N coupled to the IHS, either permanently or temporarily, networks available to the IHS and the performance characteristics of those networks, software installers available on the IHS, etc.

Initial productivity and security targets for instantiation of a workspace may be calculated based on the context of user's 201 actions in requesting the workspace (e.g., procedures used to identify the user) combined with the productivity and security context in which the workspace will operate. The productivity and security targets may also be based on behavioral analytics related to user 201, IHS 100 telemetry and/or environmental information (e.g., collected via sensors 112). In some cases, at 205, a local management agent operating on IHS 100 may calculate initial security and productivity targets based upon the collected security and productivity context. In other cases, a remote workspace orchestrator 206A-N may calculate security and productivity targets for instantiation of a workspace on IHS 100.

As used herein, the term "security target" generally refers to the attack surface presented by a workspace that is created and operated based on a workspace definition, while the term "productivity target" generally refers to the productivity characteristics of a particular workspace definition. Examples of a productivity target include, but are not limited to: type of data or data source available to user 201, minimum latency of a workspace, responsiveness of the IHS 100, etc. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from other processes operating on IHS 100, the ability to access a browser within a workspace, the ability to transfer data between workspaces, the ability to extend a primary workspace using one or more subordinate workspaces, the security context for any subordinate workspaces, etc.

Moreover, the term "workspace definition" generally refers to a collection of attributes that describe aspects a workspace that may be assembled, created, and deployed in a manner that satisfies a security target (i.e., the definition provides an attack surface for the workspace that presents an acceptable level of risk) and a productivity target (e.g., data access, access requirements, upper limits on latency, etc.) in light of the security context (e.g., location, patch level, threat information, network connectivity, etc.) and the productivity context (e.g., available computing resources on IHS 100, performance characteristics of IHS 100, network speed, etc.) in which the workspace is to be deployed. A workspace definition may enable fluidity of migration of an instantiated workspace, since the definition supports the ability for a workspace to be assembled on any IHS according to embodiments that is configured for operation with a workspace orchestration service.

In describing capabilities and constraints of a workspace, a workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that can be executed in the defined containment of the workspace to enable user 201 to be productive with one or more data sources, additional applications that are included in the workspace to enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources, constraints on the ability to generate subordinate workspaces, descriptions of any already operating subordinate workspaces, etc.

In some embodiments, workspace definition 208 selected for operation of a workspace may specify a computing architecture for use in the operation of the workspace. Such a computing architecture may be selected for use by a workspace based in part on a security context of the IHS, where this security context may account for factors such as the security posture of IHS 100, user 201 of IHS 100, environment 202 in which IHS 100 is being operated, and/or the information that is being accessed via the workspace. In this manner, the attack surface presented by the computing architecture in use by a workspace may be selected to be commensurate with the security context in which the workspace will operate.

In some embodiments, a computing architecture in use by a workspace may include the use of one or more subordinate workspaces that may operate using the discrete logic and memory resource of devices 122A-H that are coupled to IHS 100, thus altering the attack surface of the workspace.

In some implementations, workspace definitions may be based at least in part on static policies or rules defined, for example, by an enterprise's Information Technology (IT) Decision Maker (ITDM). In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206A-N may autonomously add that application to the default workspace definition for that user.

With respect to FIG. 2B, during orchestration phase 200B, the initial security and productivity targets are processed and/or reconciled against resources, device capabilities, and cloud services available, etc., to produce workspace definition at 208. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), any subordinate workspaces, one or more remote workspace orchestrators 206A-N that are authorized to modify a workspace definition or to otherwise interface with a workspace, etc.

The initial workspace definition may then be utilized by automation engine 302 of workspace orchestration service 206 to coordinate assembly 209 and instantiation 210 of a workspace using a selected computing architecture of the IHS 100 in which the workspace will operate. In cases where a workspace is cloud-hosted, automation engine 302 may assemble and instantiate a remote workspace that may be accessed via a secure connection established via a web browser or other web-based component operating on IHS 100. In some embodiments, automation engine 302 may resolve configuration conflicts between a workspace definition and the user's inputs in the operation of a workspace.

The instantiated workspace is operated by user 201 at 211, and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if an instantiated workspace has parameters that fall outside of the range of the target indexes such that a difference between additional or updated context information and the initial or previous context information is scored below a threshold value, automation engine 302 may process the assembly of modifications to an existing workspace and deploy such modifications at 210. Conversely, if the difference between the additional or updated context information and the initial or previous context information is scored above a threshold value, automation engine 302 may generate a new workspace at 210. In generating a new workspace 210, session data metadata and context may be preserved by data aggregation engine 336 and session data may be restored within the new workspace as applicable.

Additionally, or alternatively, the method may terminate or retire the initial or previous workspace at 213, as part of termination phase 200C. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or at workspace orchestration service 206 may be released.

As indicated in FIG. 2B, orchestration phase 200B may include the use of multiple remote workspace orchestrators 206A-N that participate in the launching and operation of a workspace on an IHS 100. In various embodiments, any number of remote workspace orchestrators 206A-N may participate in the ongoing operation of a workspace. For instance, remote workspace orchestrator 206A may be operated by the manufacturer of IHS 100 and may support configuration of a workspace on IHS 100 that provides the user with a launch point for requesting access to protected resources. Through this launch point, a user may select access to protected corporate data, such as a spreadsheet that includes protected corporate financial information. Based on this selection, a local management agent operating on IHS 100 may invoke a corporate remote workspace orchestrator 206B that provides a workspace definition for use in configurating and operating a new workspace on IHS 100 that provides protected access to the requested spreadsheet.

In one scenario, safely accessing the requested spreadsheet may require installation of an updated spreadsheet program on IHS 100. In this scenario, the local management agent of IHS 100 may invoke third remote workspace orchestrator 206N for initiating an update to the spreadsheet program that is available through the workspace. In this manner, various remote workspace orchestrators 206A-N may support the deployment and ongoing operation of workspaces on IHS 100.

As such, in various embodiments, the method of FIGS. 2A and 2B enables secure user productivity even when a workspace operates on an IHS or cloud platform that is not under direct management. Such method also provides for dynamic or adaptive configurations and policies allowing for the best possible user experience while maintaining appropriate level of security. In some cases, the definition of a productivity environment and access requirements may be selected based upon productivity and security dependencies and targets, and the definition of capabilities related to the workspace may be adaptive in nature. Particularly, workspace definition attributes may be dynamically selected based upon historical productivity and security information, based upon each individual user or group's behavior.

Figure 3A:
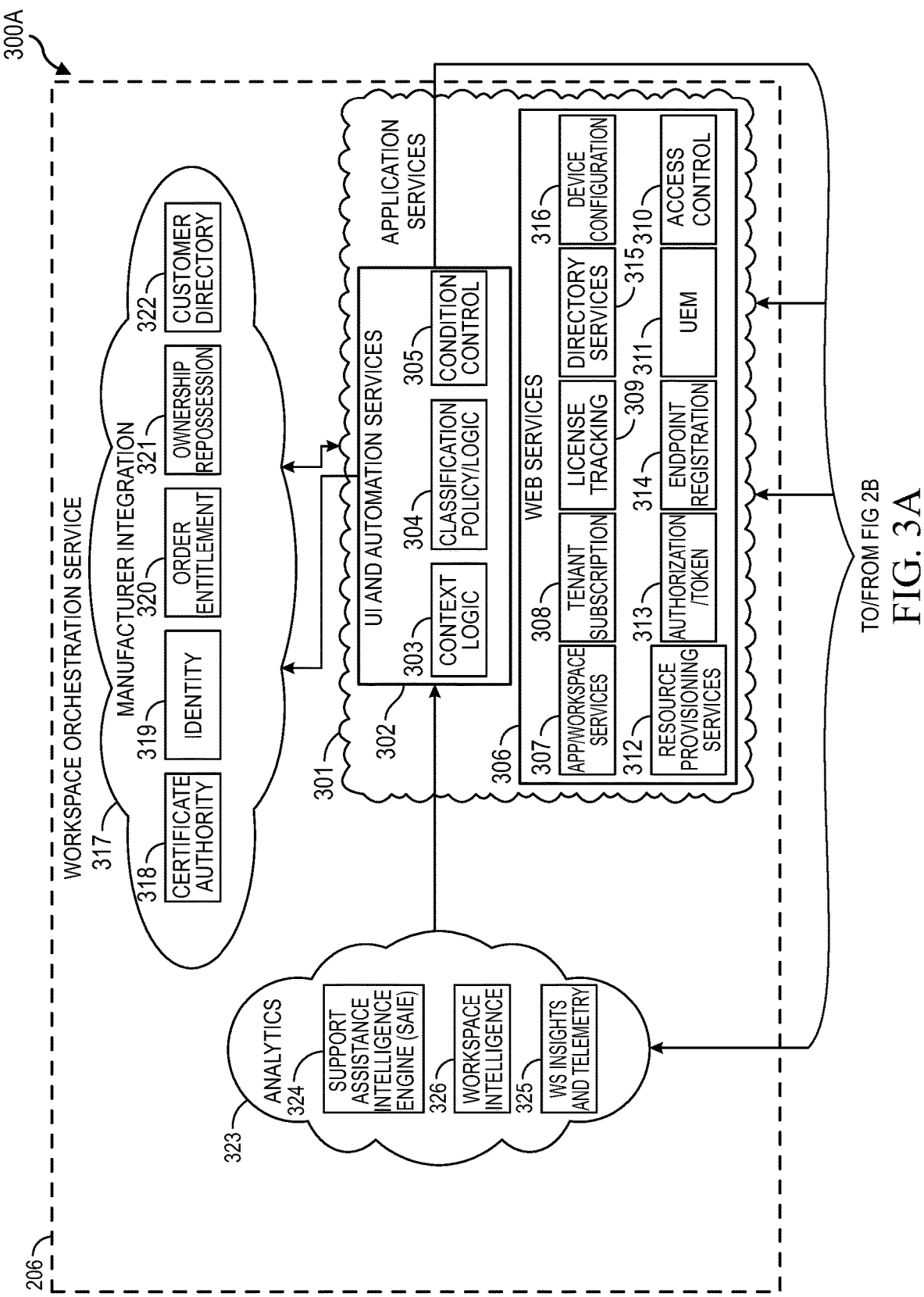
FIGS. 3A and 3B are a diagram depicting an example of a system configured for deploying and operating workspaces on an IHS, according to various embodiments.
Figure 3B:
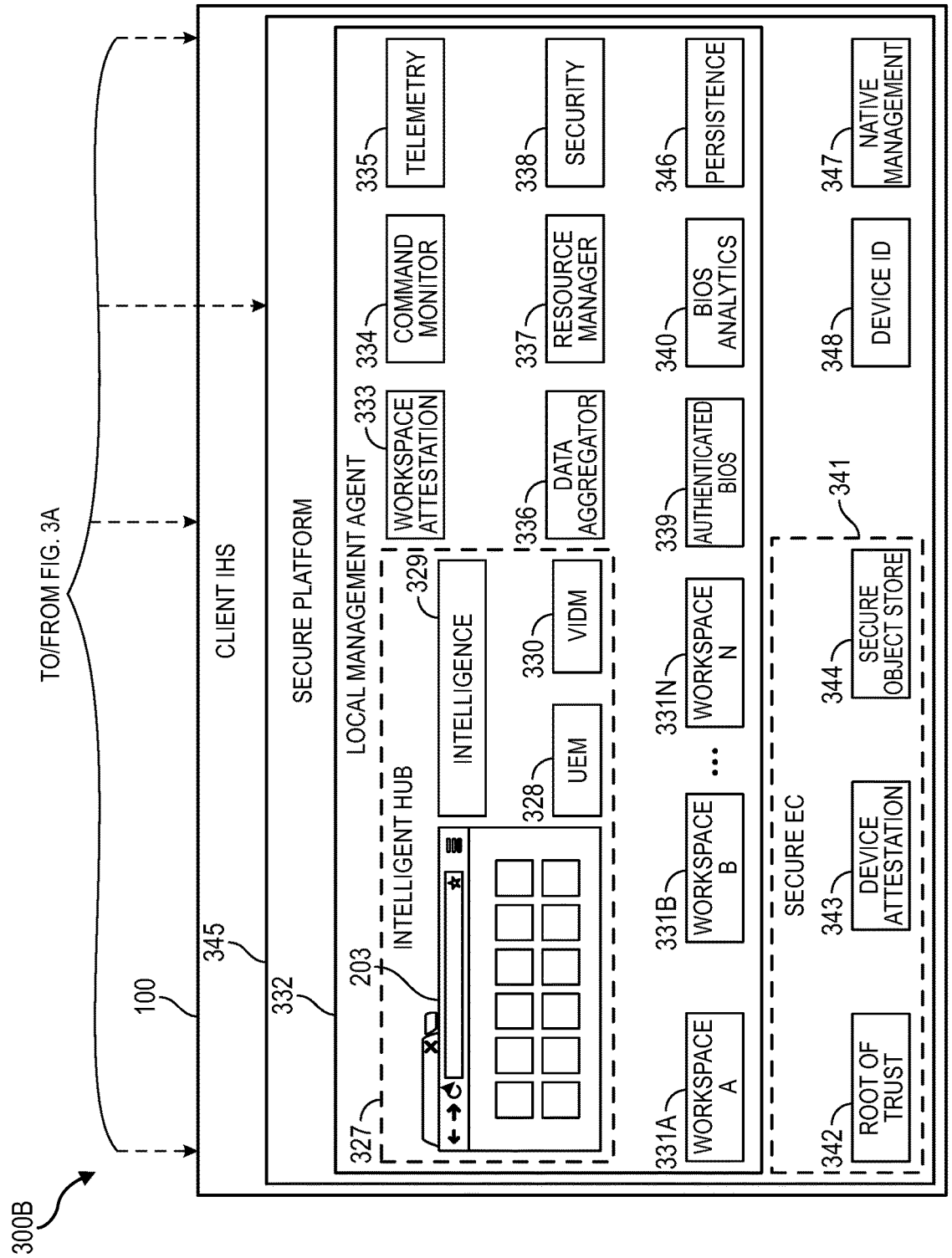

FIGS. 3A and 3B show a diagram of an example of system components 300A and 300B (collectively referred to as "system 300") configured for the operation of subordinate workspaces on an IHS. Particularly, system 300 may include one or more IHSs remotely located and/or networked having program instructions stored thereon that, upon execution, cause the one or more IHSs to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100.

System 300 may include program instructions that, upon execution, cause IHS 100 to perform various local management operations described herein, including, but not limited to, the collection of productivity and security context information, the calculation of productivity scores and/or risk scores, the instantiation, execution, and modification of a workspace based upon files, definitions, or policies, such as workspace definitions.

Components 300A and 300B of system 300 may be coupled to and/or in communication with each other via any suitable network technology and/or protocol, which allows workspace orchestration service 206 to be remotely provided with respect to local management agent 332. As described with regard to FIG. 1, an IHS 100 according to embodiments may include a component such as a trusted controller that may support certain secure out-of-band communications that are independent from the OS of IHS 100. In some embodiments, such a trusted controller may be configured to support deployment and operation of local management agent 332 and/or to report changes in context to workspace orchestration service 206.

As described with regard to FIGS. 2A and 2B, multiple workspace orchestration services 206A-N may be operate in support of a workspaces. Accordingly, workspace orchestration service illustrated in FIG. 3A may correspond to any of these individual workspace orchestration services 206A-N, where each of these workspace orchestration services may include any of all of the components and systems described with regard to FIG. 3A. In some embodiments, orchestration of an individual workspace operating on IHS 100 may be transferred between different workspace orchestration services throughout the lifecycle of the workspace.

For instance, a workspace may be configured and initialized based on a workspace definition provided by a workspace orchestration service that is operated by the manufacturer of IHS 100. However, during ongoing operation of this particular workspace, orchestration of the workspace may be transferred to a workspace orchestration service operated by an entity that employs the user of IHS 100. Further operation of this workspace may then result in orchestration being transferred to a workspace orchestration service operated by a provider of software operating on the IHS, such as by the provider of an operating system of IHS 100.

As illustrated in system 300A of FIG. 3A, workspace orchestration service 206 may include a number of sub-components that support deployment and ongoing evaluation and adaptation of workspaces on IHS 100. Embodiments of workspace orchestration service 206 may include systems that may support: web services 306, manufacturer integration 317, and analytics services 323. Moreover, web services 306 may comprise application services 301 and user interface (UI) and automation services 302.

Analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues.

Workspace insights and telemetry engine 325 may be configured to analyze and/or produce device-centric, historical, and behavior-based data (e.g., hardware measurements, use of features, settings, etc.) resulting from the operation of workspaces.

Workspace intelligence module 326 may include any suitable intelligence engine, such as machine learning models, for processing and evaluating collected context data to identify patterns and tendencies in the operation of workspaces and in the adaptation of workspaces based on context changes.

Application services 306 system of workspace orchestration service 206 includes UI and automation services 302 system that may include context logic module 303, classification policy 304, and condition control module 305. Context logic module 303 may support processing of context information in making risk assessments (e.g., evaluating the risk associated requests by the user against the context of the user's behavior, history of the user's IHS, capabilities of the user's IHS, and environmental conditions). For instance, security context information collected by IHS 100 may be provided to workspace orchestration service 206 where it may be used, such as by context logic 303, to calculate a risk score associated with a request for use of a managed data source and/or application.

Classification policy 304 may include administrator and machine-learning defined policies describing risk classifications associated with different security contexts, such as risk classifications for specific data, locations, environments, IHSs, logical environments, risk classifications for subordinate workspace topologies, or user actions (e.g., use of high-risk data requires use of a workspace definition suitable for use with a risk score above a specific value).

Condition control module 305 may include intelligence providing automated decision making for appropriately aligning risk and context. In some cases, condition control module 305 may dynamically deploy a solution to address any detected misalignment of risk and context.

For instance, upon requesting access to a highly classified data source that results in a significant increase in risk score, the condition control module 305 may select workspace definition modifications that implement security procedures that are suitable for the higher risk score. In another example, based on hardware resources available on an IHS 100, the condition control module 305 may determine a risk score for an existing workspace operating on the IHS may be lowered through adaptation of the workspace into a primary workspace that operates using the main hardware resources of the IHS and one or more subordinate workspaces that operate on discrete external hardware components coupled to IHS 100.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify whether a user will be provided access to an application in this manner.

Web services 306 may also include a tenant subscription module 308, that performs dynamic configuration of an IHS and deployment of the described workspace orchestration services at the point-of-sale (POS) of an IHS, or of hardware or software components purchased for installation in the IHS.

License tracking module 309 may be used to maintain and track license information or other entitlement credentials for software, services, and IHSs.

Access control module 310 may specify polices used in controlling access to data and applications by authorized users.

Unified Endpoint Management (UEM) module 311 may be configured to support the described orchestration of workspaces on various IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring).

In some cases, resource provisioning services 312 may include secrets provisioned as part of a trusted assembly process of IHS 100 and, in some instances, associated with a unique identifier 348 of the IHS 100.

Web services 306 may also include an authorization/token module that provides identity functions and may connect to various authentication sources, such as, for example, Active Directory.

Endpoint registration module 314 may be configured to register IHSs and/or workspaces with management service that tracks the use of the described workspace orchestration.

In some scenarios, directory services 315 module may be configured to provide active directory services (e.g., AZURE ACTIVE DIRECTORY from MICROSOFT).

Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration.

Still referring to FIG. 3A, manufacturer integration components 317 may communicate with application services 301 and client IHS 100 to provide features that are usable during workspace evaluation and instantiation, where these features are based upon information available to the manufacturer of client IHS 100.

For instance, certificate authority 318 may include or provide access to a certificate authority that issues digital certificates that may be used in validating the authenticity and integrity of the hardware of IHS 100.

Identity service module or engine 319 may be configured to manage the identity of a user and/or owner of an IHS, as well as brokering user identification for utilizing and updated customer directory 322.

Order entitlement module 320 may be responsible for managing the entitlements purchased as well as the associated issued certificates, that may include certificates signed by a certificate authority 318.

Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS.

Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to FIG. 3B, in some embodiments, IHS 100 may be configured to operate local management agent 332 that may run within a secure execution environment 345 hosted by trusted controller 341, such as trusted controller 115 of FIG. 1. In other embodiments, local management agent 332 may operate as a trusted and attestable process of the OS of IHS 100.

In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating. Accordingly, depending on the context in which the workspace is operating, the workload(s) in each of workspaces 331A-N may be hosted in a public cloud, a private cloud, a specific server, using various topologies of subordinate workspace, or locally hosted in full or in part on IHS 100. These allocations of computing resources that comprise the computing architecture for each particular workspace 331A-N may be individually prescribed by the respective workspace definition that is used to build and operate each workspace.

As described, the workspace definition may be created by workspace orchestration service 206 based upon context information provided by IHS 100, security targets for each workspace 331A-N, and productivity targets for each workspace 331A-N.

In some embodiments, local management agent 332 may be configured to host, launch, and/or execute a workspace hub 327 that provides a launch point 203 by which user's initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein. In various embodiments, the launch point 203 may be provided in the form for textual, graphical and/or audio user interfaces that allow a user of IHS 100 to select available data and/or resources. In some embodiments, workspace hub 327 may utilize a local environment management module 328 in providing the workspace interface that is presented to the user on IHS 100 and doing so in a consistent manner across workspaces 331A-N. Workspace hub 327 may also include a local intelligence logic 329 used to support modeling the use of IHS 100 in order to improve characterization of the actual risk associated with a risk context. User authentication and access control operations may be performed by a local identity module 330 that may interface with trusted controller 341 in providing user authentication.

In some cases, each instantiated workspace 331A-N may be a logical environment that provides a user with access to requested data or applications, where the environment may operating using a computing architecture that may be isolated in varying degrees from the hardware and software of IHS 100 based on the security context and productivity context in which each workspace 331A-N is operating. In some instances, the selection of a data source or resource that are available to user via launch point 203 may result in launching a new workspace. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for accessing that particular confidential presentation on that particular IHS. In other instances, a selection of the presentation file by a user may result in the presentation being made available through the existing workspace, in some cases using the existing workspace definition and, in other cases, using a workspace definition that has been modified to support the requested access to the confidential presentation file.

Although workspaces 331A-N supported by IHS 330B may each be isolated to varying degrees from the hardware and/or software of IHS 100 and from each other, a user of IHS 330B may expect to be able to operate the multiple workspaces 331A-N in a manner that allows content to be transferred between the different workspaces 331A-N. For instance, a user may select a portion of the data displayed in workspace 331A and utilize OS or other workspace functions to copy the data for copying to workspace 331B.

In various embodiments, local management agent 332 may operate in full or in part on secure platform 345 hosted by trusted controller 341, such as described with regard to FIG. 1, that operates independent from the OS of IHS 100. In some embodiments, all or part of local management agent 332 may operate as trusted components of the OS of IHS 100. To execute the various operations described herein, local management agent 332 may include command monitor 334 configured to provide instrumentation to receive commands from workspace orchestration service 206 in support of the workspaces operating on the IHS. For instance, such commands supported by local management agent 332 may provide for a new workspace definition to be specified for an individual workspace 331A-N, such as through a new workspace definition that reconfigures use of existing IHS resources into a primary workspace and one or more subordinate workspaces, where the primary workspaces and each of the subordinate workspace all operate according to their own respective workspace definitions. In some embodiments, command monitor 334 may be reconfigured to interface with different workspace orchestration services in support of the ability to transfer orchestration of an individual workspace 331A-N between different workspace orchestration services.

Local management agent 332 may also include telemetry module 335 that may be configured for communicating collected information to workspace orchestration service 206, including IHS resource availability and including reporting changes in context that may warrant adjustments to workspaces 331A-N. Data aggregator 336 may track all of the data source and other resources (e.g., applications, local or cloud-based services) that may be provided to the user via a workspace.

Local management agent 332 may utilize resource manager module 337 that is configured to manage access to data, network configuration, such as for VPNs and network access, identity information, access control, and resource provisioning services. Security module 338 may be configured to provide various security services.

BIOS interface 339 may provide a secure BIOS interface used for accessing and managing credentials in secure object storage.

BIOS analytics module 340 may be configured to perform forensic services for BIOS telemetry and health assessments.

Persistence module 346 may be configured to support persistence of applications entitled at a POS or assigned by administrators and supported with required license tracking.

Workspace attestation module 333 may provide a platform centric service layer on top of a container engine provided by local management agent 332 and may be used to measure and attest workspaces 331A-N in any suitable manner defined or orchestrated by a condition control module 305 of a workspace orchestrator 206.

As part of secure platform 345, native management module 347 may be configured to enable an out-of-band management interface for interoperation with workspace orchestration service 206, where this OOB interface operates independent form the OS of IHS 100, as described with regard to FIG. 1.

In some embodiments, the OOB management interface supported by native management module 347 may be utilized by device configuration services 316 of the workspace orchestration service to access the secure platform services 345 of IHS 100, thus providing a reliable mechanism for workspace orchestration service 206 to interface with IHS 100, and more particularly to the resources of the IHS that are being used to operate workspaces 331A-N.

Digital device ID module 348 may provide a unique, un-spoofable, cryptographically bound identifier. In embodiments supporting secure platform 345, secure embedded controller 341 may be a hardened hardware module that may include root of trust module 342 configured as a trusted data store and, in some cases for cryptographic processing, that may be trusted within a cryptographic system.

Device attestation service 343 may be configured to perform device assurance and trust services (e.g., secure BIOS and secure boot, etc.).

Secure object store 344 may be provided that is configured to lock and access keys, hashes, and/or other secrets in an EC and/or TPM.

In some scenarios, IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how the systems and methods described herein operate to modernize workspace and hardware lifecycle management in an enterprise productivity ecosystem, three non-limiting use cases or examples are discussed in turn below.

Use Case A

In use case A, a user employed by an enterprise may request access to a protected data source while on the enterprise's premise and while using an enterprise-owned and configured notebook computer, which may be configured as described with regard to IHS 100 of FIG. 1 and client IHS 100 of FIG. 3B.

In response to the request, a local management agent 332 operating on the user's notebook retrieves information describing the current context in which the protected data will be accessed and calculates security and productivity targets based on the determined context information. In this use case, the local management agent may have been installed on the IHS by an IT administrator, and may operate as background service. When the user selects the protected data, such as via a launch point selection provided by the OS of the notebook, the local management agent notifies a workspace orchestration service provided by the enterprise of the request for access to the protected data. In response, workspace orchestration service of the enterprise generates a workspace definition for generating and operating a workspace on the IHS by which the user may be provided access to the protected data. One received at the IHS, the protected data may be restricted for access only by a specific workspace based on file classification (e.g., file metadata/type/properties/permissions, folder location, encrypted region, etc.). Throughout use of the protected data, the local management agent may collect context information, some or all of which may be sent to the orchestration service for use in updating the risk and productivity scores of the workspace.

In this example, the workspace orchestration service may determine the context to have an overall security risk of "2," in some instances using a weighed, machine learning, or artificial intelligence algorithm. This overall security risk of 2 may be based upon the locale (e.g., an enterprise locale with a lowest risk score of 1), user identity (e.g., a high-confidence identification of a sophisticated user, such as a known user with a history without significant security protocol violations has a low risk score of 2), network risk (e.g., a low risk score of 1 based on use of a wired network connection controlled by the enterprise), IHS risk (e.g., a risk score of 1 based on a high level of control of an enterprise owned/managed IHS that operates known software versions with security features enabled); regulatory risk (e.g., a risk score of 1 based on that lack of any regulatory restrictions on this particular data, such as restrictions with respect to General Data Protection Regulation or "GDPR," Health Insurance Portability and Accountability Act "HIPAA," Payment Card Industry "PCI," technology export regulation, etc.), and data type (e.g., a risk score of 8 based on the requested data being stored in a confidential datafile).

In evaluating the request, the workspace orchestration service may also calculate a productivity score of "9," also using a weighed, machine learning, or artificial intelligence algorithm. This productivity score of 9 may be based upon the locale e.g., a score of 10 based on use of the data at a location of the enterprise), user identity (e.g., a score of 9 in light of a "skilled" classification of the user based on advanced compute tasks by the user, proficiency of the user, and/or speed of operation by the user), network speed/latency (e.g., a score of 10 based on use of fast, wired, Gigabit Ethernet supported by the enterprise's internal network), IHS performance (e.g., a score of 8 base the speed of the CPU, expense of the CPU, memory availability, graphics processing capabilities, storage) and data type (e.g., a score of 10 based on the protected data being made available as a local file in protected memory that is easy to read/write with low latency and high performance on local storage).

Based upon the security score and/or context information, the workspace orchestration service builds a workspace definition file having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, non-multifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local file-system encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, the workspace orchestration service and the local management agent may give the user access to the requested local confidential file, and the user may begin working in a newly created workspace.

Use-Case B

In use-case B, a user may request access to a confidential datafile while at a coffee shop using an open public network and an IT-managed/owned PC, such configured as described with regard to IHS 100 of FIG. 1 and client IHS 100 of FIG. 3B.

First, a local management agent 332 executed by client IHS 100 retrieves the requested context and calculates security and productivity scores based on context. In this use-case, the local management agent may have been installed by IT, and it may be running in the background as a service. The confidential data may be kept on a shared IT-managed network resource on-premises (e.g., back in a main corporate office), and the local management agent may be responsible for monitoring when this data path is requested by the user (e.g., the user hits a specific URL, IP, etc.). Moreover, the local management agent may continuously collect all context and send it to the workspace orchestration service to assist in scoring processes later (this may also be done at the time of the user's access request or indication of intent, rather than a continuous collection).

When the user selects the desired confidential datafile, client IHS 100's OS calls the local management agent associated with the path to the confidential datafile and calls back to a remote workspace orchestration service 206 to request a workspace definition.

In this example, the workspace orchestration service may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

The workspace orchestration service may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high—worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of 7 (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application—preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, the workspace orchestration service and the local management agent may give the user access to the requested local confidential file, and the user may begin working in a newly created workspace.

Use-Case C

In use-case C, a user may request access to a confidential datafile in a web hosted remote portal using a browser from Kazakhstan, while at an internet café with a borrowed/rented PC, such configured as described with regard to IHS 100 of FIG. 1 and client IHS 100 of FIG. 3B, on an open Wi-Fi network.

First, a remote workspace orchestration service 332 intercepts the access request and evaluates the browser and user context, and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to the workspace orchestration service to request a workspace definition.

In this example, the workspace orchestration service may score an overall security risk to have a value of 9, using a weighed, machine learning, or artificial intelligence algorithm, based upon the following context information or inputs, each of which is also scored as a risk metric based upon a selected policy: locale (e.g., a risk score of 9 for operation of the IHS in Kazakhstan); user persona: 1 (user was expected to be there, the timing seems right based upon past logins, and he has a biometric watch communicator proving he is alive, himself, and located where he says he is—so that IT can always trust him); network risk: 9 (high, public and in a very obscure place); device risk: 9 (zero trust); and regulatory: 8 (based on user, data, location combinations).

The workspace orchestration service may also calculate a productivity score to have a value of 5, using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification—advanced compute tasks, proficiency, and speed); network speed/latency: 3 (low quality—Wireless G from a long way away); and device performance: 3 (have to be able to tolerably browse web pages but based on what the service believes the capabilities will be, the service should build simple ones).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch—session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, the workspace orchestration service and remote cloud web portal (e.g., session the user logged into through the browser) may assemble the workspace and instantiate it for the user in the browser. For example, the web portal may receive definition files (e.g., JSON, XML, etc.) from the orchestration service, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled—user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations—do not allow anything except bitmap renderings through the enforceable network); network integrity: 4; memory confidentiality: 9 (web page viewer only—no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality—prompt user at least—adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate). After confirming the configuration, the workspace orchestration service and the local management agent may give the user access to the requested rendered data, and the user may begin working in a newly created workspace.

In various embodiments, systems and methods may be deployed for managing credentials usable in the orchestration of workspaces (e.g., 206A-N). Particularly, in various implementations, for an orchestrator to perform management operations with respect to a workspace or workspace resource (e.g., applications, services, policies, settings, configurations, OSs, hardware devices, and features thereof), the orchestrator may need to be in possession of the appropriate credentials (e.g., password, key, certificate, etc.). For example, in connection with the instantiation of a workspace, such credentials may be provided to the orchestrator by an ITDM/OEM service or the like.

There are many situations with multi-cloud managed workspaces, however, where the workspace orchestration credentials can only be maintained by one orchestrator at a time. In cases where credentials cannot be shared, to facilitate transitioning its orchestration from a first remote orchestrator to a second remote orchestrator, a workspace must transition from a managed state to an unmanaged state, and then back to managed again. In some embodiments, the process of moving through workspace lifecycle stages to allow replacement of credentials may allow multiple orchestrators to manage a single workspace without credential sharing.

As used herein, the terms "domain," "management domain," or "orchestration domain" refer to areas of control that provide logical separation that allows or restricts access by a remote orchestrator (or a user authorized by the remote orchestrator) to a workspace, or to one or more workspace resources. Examples of workspace resources include, but are not limited to: applications, services, policies, OSs, or hardware devices. Moreover, examples of types of access requests or management operations that may be issued by users or remote orchestrators may include, but are not limited to: read, write, transforming, or configuring data or features of workspaces or workspace resources.

In some cases, a workspace may be subject to management by two or more remote orchestrators concurrently or sequentially, and each orchestrator may belong to a distinct domain. For example, a first orchestrator may belong to a first domain, a second orchestrator may belong to a second domain, and the first and second domains may be mutually exclusive. As another example, the second domain may be included in the first domain, such that a first orchestrator in the first domain has access to an entire superset of resources and a second orchestrator in the second domain has access only to a subset of workspace resources. A third orchestrator in a third domain, such that the third domain is within the second domain, may have access only to a portion of the subset of workspace resources, and so on.

Within each domain, an orchestrator may have authority to issue "ownership credentials" to a user, which in turn enables the user to manage a workspace or workspace resource under that orchestrator's management oversight. Examples of "ownership credentials" may include, but are not limited to: passwords, encryption keys, and digital certificates.

As used herein, the terms "password" or "passcode" refer to secret data, typically a string of characters, usually used to confirm a user's or device's (e.g., an orchestrator's) identity. An "encryption key" is a piece of information, usually a string of numbers or letters that are stored in a file, which, when processed through a cryptographic algorithm, encode or decode data.

Meanwhile, the terms "digital certificate," "public key certificate," "identity certificate," or simply "certificate" refer to an electronic document usable to prove the validity of a unique public-private key pair. Typically, a certificate includes information about the public key, information about the identity of its owner, and the digital signature of an entity that has verified the certificate's contents. If the signature is valid, then the orchestrator or user in possession of the private key can use that key to communicate securely with a workspace. If the signature is not valid, the orchestrator or user may be denied access to the workspace and/or workspace resource(s).

In each domain, a workspace may assume one of two states: owned and unowned. If a workspace is in an "unowned state," this means there are no users or customers to whom credentials—here referred to as ownership certificates—have been issued for that workspace's orchestrator. Conversely, if a workspace is in an "owned state," this means that at least one user and/or orchestrator—i.e., an "owner"—has been issued a credential.

When a workspace is in any given state, state transition or control transfer rules or policies may be enforced such that certain requests for credentials, whether by another orchestrator or by a user, are allowed or denied based upon: (a) the current state, (b) the next state, (c) a relationship between orchestrators or domains, or (d) selected telemetry and contextual information, as outlined in a policy, such as a state transition policy and/or workspace definition.

In some embodiments, a workspace itself, using a cloud-agnostic local orchestration engine (e.g., local management agent 332), may maintain workflow states asynchronously from remote orchestrators (e.g., 206A-N). The workspace may use a local state transition policy to enforce state transitions in approved lifecycle directions only, thus allowing transfer of control, in a managed way, from one cloud, orchestrator, or domain to another.

Additionally, or alternatively, improper or unapproved state transitions may be restricted by the policy, as enforced by the workspace, therefore preventing flows between those states. A workspace may also prohibit multiple simultaneous orchestration credentials, establishing a single orchestrator as the sole remote orchestrator during any lifecycle stage of the workspace to avoid collisions in orchestration activities.

As such, systems and methods described herein allow local policy enforcement from within various workspace lifecycle stages to provide unique and secure workflows.

Figure 4:
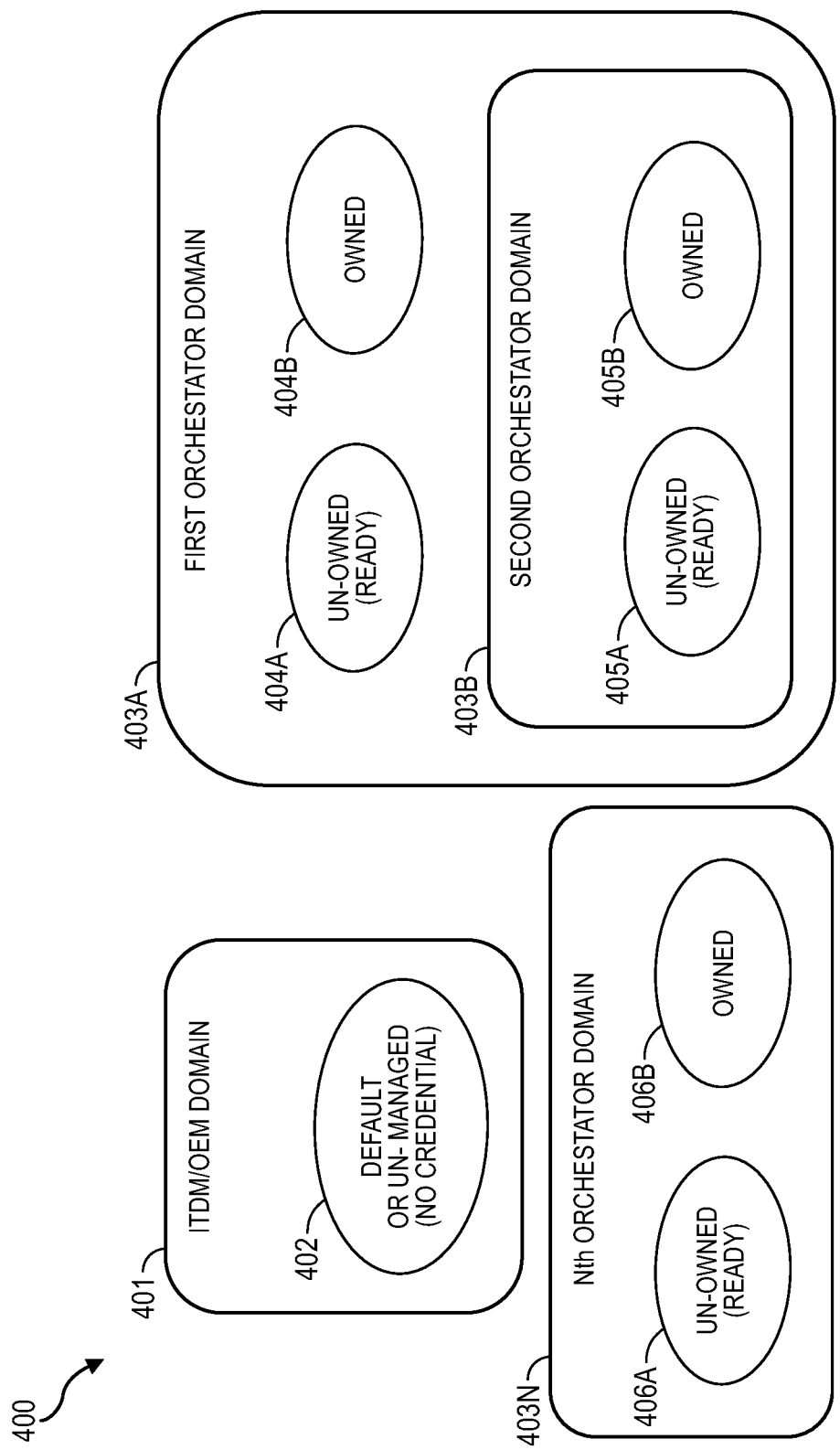
FIG. 4 is a diagram illustrating an example of a system for managing credentials usable in the orchestration of workspaces by multiple remote orchestrators, according to various embodiments.

In that regard, FIG. 4 is a diagram illustrating an example of system 400 for managing credentials usable in the orchestration of workspaces by multiple remote orchestrators. In some embodiments, system 400 may include OEM domain 401 and a plurality of orchestration domains 403A-N. OEM domain 401 may include an OEM service that enables a workspace to assume initial, default, or un-managed state 402, where no management credentials are available, such that the workspace remains unmanaged by any orchestrator.

In this example, first orchestrator domain 403A, second orchestrator domain 403B, and Nth orchestrator domain 403N may each assume one of two possible states at a time: unowned (ready) 404A-406A, or user/customer owned 404B-406B. Each of orchestrator domains 403A-N may be associated with a distinct remote orchestrator. Moreover, each such orchestrator may provide credentials to other entities, such as other orchestrators or users, for allowing them to manage a workspace following a state transition policy.

In some embodiments, a "state transition policy" may include a set of one or more rules that establish allowed or forbidden transitions between states 402, 404A, 404B, 405A, 405B, 406A, and 406B depending upon the domain hierarchy of system 400. Additionally, or alternatively, these rules may establish allowed or forbidden transitions between states based upon contextual or telemetry data. In some cases, a state transition policy may be associated with, included, or indicated in a workspace definition used to instantiate a workspace.

In this example, second orchestrator domain 403B is included within first orchestrator domain 403A. Conversely, Nth orchestrator domain 403N is exclusive of both first and second orchestrator domain. In various implementations, ITDM/OEM domain 401 is generally exclusive of any other domain. It should be understood, however, that the domain hierarchy of system 400 is shown for sake of illustration only and that others are possible.

FIG. 5 is a diagram illustrating an example of method 500 for managing credentials usable in the remote orchestration of workspaces. In some embodiments, method 500 may be performed, at least in part, by IHS 100.

Particularly, method 500 starts at 501. At 502, method 500 may determine whether a first orchestrator (e.g., 206A) in a first domain (e.g., 403A) has a first credential. If not control stays at 502. If so, at 503 method 500 may allow the first orchestrator to manage a workspace instantiated by IHS 100 or a set or workspace resources associated with the workspace (and/or the first domain) in response to the first orchestrator having the first credential.

At 504, method 500 may determine whether a second orchestrator (e.g., 206B) in a second domain (e.g., 403B) within the first domain has a second credential provided by the first orchestrator, for example, in response to a request from the second orchestrator to manage the workspace. If not, control returns to 502.

If so, at 505, method 500 may allow the second orchestrator to manage the workspace or a subset of workspace resources. In some cases, the first and second orchestrators may each be operated by an ITDM, an OEM, an OS developer, and/or a third-party. The first domain may provide or restrict access to or from a first set of one or more workspace resources, and the second domain may provide or restrict access to or from a second set of one or more workspace resources.

In some cases, the first and second sets of one or more workspace resources may include at least one of: an application, a service, a policy, an OS, or a hardware device. Moreover, the first set of one or more workspace resources may include the second set of one or more workspace resources.

The first and second management credentials may include at least one of: a password, an encryption key, or a digital certificate. The first domain may include an ITDM/OEM domain, and the second domain may include an OS developer domain or a third-party domain.

In some cases, prior to the second remote orchestration being allowed to manage the workspace at 505, method 500 may revoke or invalidate the first credential. Also, to allow the second orchestrator to manage the workspace, method 500 may enforce a state transition policy configured to allow a selected state transition.

For example, a state transition policy may be included or indicated in a workspace definition used to instantiate the workspace. The state transition policy may associate a rule with the selected state transition. The rule may refer to contextual or telemetry data. Additionally, or alternatively, to allow the second orchestrator to manage the workspace, method 500 enforce a state transition policy configured to deny a selected state transition.

FIG. 6 is a diagram illustrating an example of another method 600 for managing credentials usable in the remote orchestration of workspaces. In some embodiments, method 600 may be performed, at least in part, by a first orchestrator (e.g., 206A).

Particularly, method 600 starts at 601. At 602, method 600 may allow the first orchestrator to manage a workspace instantiated on IHS 100 (e.g., by first orchestrator 206A) using a first credential issued, for example, by an ITDM/OEM service. At 603, method 600 may receive a request from a second orchestrator (e.g., 206B) to manage the workspace.

At 604, method 600 may determine whether the request meets a requirement indicated in a state transition policy. If not, control returns to 602. If so, at 605 method 600 may issue a second credential to the second orchestrator.

In some cases, the second credential may allow the user to manage the workspace with a same or a fewer set of privileges as the first orchestrator. Additionally, or alternatively, the first orchestrator may issue a third credential to one of its users or customers that allows the user to manage the workspace with the same or fewer set of privileges as the first orchestrator.

Figure 7:
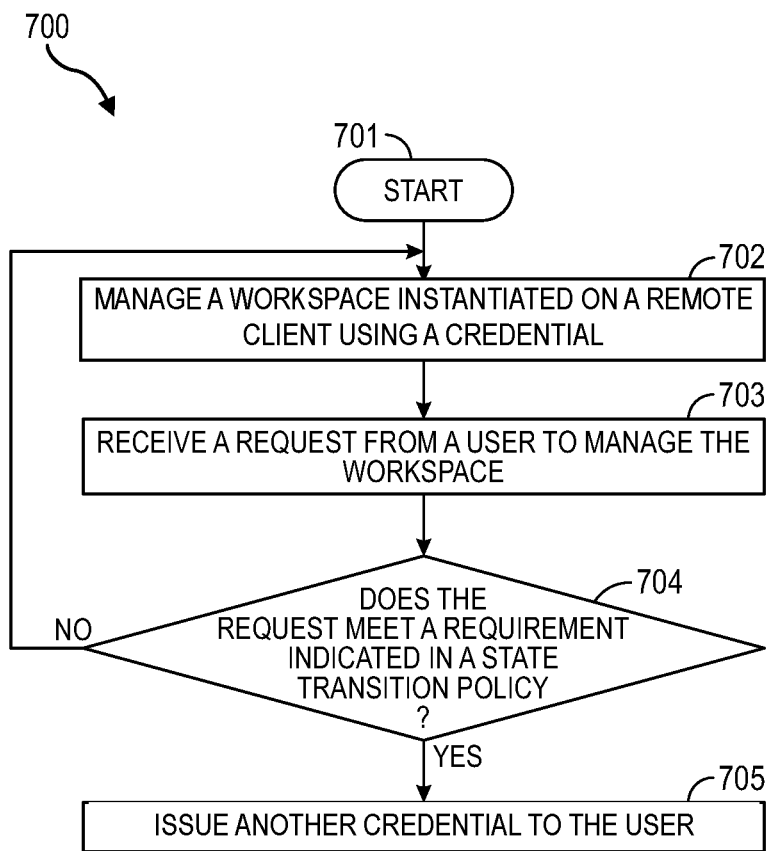

FIG. 7 is a diagram illustrating an example of yet another method 700 for managing credentials usable in the remote orchestration of workspaces. In some embodiments, method 700 may be performed, at least in part, by a first orchestrator (e.g., 206A).

Particularly, method 700 starts at 701. At 702, method 700 may allow the first orchestrator to manage a workspace using a credential issued, for example, by an ITDM/OEM service. At 703, method 700 may receive a request from a user or customer of the first or a second orchestrator (e.g., 206B) to manage a workspace instantiated by IHS 100. As before, here each of the orchestrators may be assigned to a respective domain, and the first orchestrator may be configured to manage the workspace using the credential.

At 704, method 700 may include determining whether the user's request meets a requirement indicated in a state transition policy applicable to a domain of the first orchestrator. If not, control returns to 702. If so, at 705 method 700 may include issuing another credential to the user, such that the other credential enables the user to manage the workspace.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution by the processor, cause the IHS to:
   allow a first remote orchestrator to manage a workspace instantiated by the IHS in response to the first remote orchestrator having a first credential, wherein the first remote orchestrator is associated with a first domain;
   receive a request from a second remote orchestrator to manage the workspace, wherein the second remote orchestrator is associated with a second domain within the first domain, wherein the first domain and the second domain are distinct logically separated areas of access control, and wherein the first domain restricts access to the workspace by the second remote orchestrator; and
   allow the second remote orchestrator to manage the workspace, at least in part, in response to a determination that the second remote orchestrator has a second credential provided by the first remote orchestrator, wherein the determination is made by the IHS based at least in part on out-of-band (OOB) network communication with the first remote orchestrator and the second remote orchestrator and a trusted controller configured to store cryptographic information for use in authorization of workspaces, and wherein the OOB network communication is isolated from any Operating System (OS) of the IHS.

2. The IHS of claim 1, wherein the first and second remote orchestrators are each operated by an entity selected from the group consisting of: an Information Technology Decision Maker (ITDM), an Original Equipment Manufacturer (OEM), a workspace management software developer, and a third-party.

3. The IHS of claim 1, wherein the first domain provides or restricts access to or from a first set of one or more workspace resources, and wherein the second domain provides or restricts access to or from a second set of one or more workspace resources.

4. The IHS of claim 3, wherein the first and second sets of one or more workspace resources comprise at least one of: an application, a service, a policy, an Operating System (OS), a database, a cloud Application Programming Interface (API), cloud storage, or a hardware device.

5. The IHS of claim 4, wherein the first set of one or more workspace resources comprises the second set of one or more workspace resources.

6. The IHS of claim 1, wherein the first and second credentials comprise at least one of: a password, an encryption key, or a digital certificate.

7. The IHS of claim 1, wherein the first domain comprises an Information Technology Decision Maker (ITDM) or Original Equipment Manufacturer (OEM) domain, and wherein the second domain comprises a workspace management software developer domain or a third-party domain.

8. The IHS of claim 1, wherein prior to the second remote orchestration being allowed to manage the workspace, the program instructions, upon execution, further cause the IHS to revoke or invalidate the first credential.

9. The IHS of claim 1, wherein to allow the second remote orchestrator to manage the workspace, the program instructions, upon execution, further cause the IHS to enforce a state transition policy.

10. The IHS of claim 9, wherein the state transition policy is configured to allow a selected state transition.

11. The IHS of claim 9, wherein the state transition policy is configured to deny a selected state transition.

12. The IHS of claim 9, wherein the state transition policy is included or indicated in a workspace definition used to instantiate the workspace.

13. The IHS of claim 1, wherein to allow the second remote orchestrator to manage the workspace, the program instructions, upon execution, further cause the IHS to enforce a state transition policy configured to deny a selected state transition.

14. The IHS of claim 1, wherein the program instructions, upon execution by the processor, further cause the IHS to:
   receive a file configured to enable instantiation of the workspace based upon a workspace definition; and
   instantiate the workspace based upon the file.

15. The IHS of claim 14, wherein the first remote orchestrator is configured to:
   calculate a security target and a productivity target based upon context information; and
   create the workspace definition based upon the security target and the productivity target.

16. The IHS of claim 15, wherein the context information comprises at least one of: an identification of a location of the IHS, an identification of a user of the IHS, an identification of a network of the IHS, an identification of hardware of the IHS, an identification of a requested datafile, or an identification of a storage system of the requested datafile.

* * * * *